United States Patent
Kanari et al.

(10) Patent No.: US 12,000,114 B2
(45) Date of Patent: Jun. 4, 2024

(54) WORK MACHINE

(71) Applicant: HITACHI CONSTRUCTION MACHINERY CO., LTD., Tokyo (JP)

(72) Inventors: Yasuhiko Kanari, Kasumigaura (JP); Hideto Ishibashi, Itako (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 580 days.

(21) Appl. No.: 17/274,448

(22) PCT Filed: Feb. 4, 2020

(86) PCT No.: PCT/JP2020/004152
§ 371 (c)(1),
(2) Date: Mar. 9, 2021

(87) PCT Pub. No.: WO2020/179320
PCT Pub. Date: Sep. 10, 2020

(65) Prior Publication Data
US 2022/0025615 A1  Jan. 27, 2022

(30) Foreign Application Priority Data
Mar. 1, 2019 (JP) .................. 2019-038047

(51) Int. Cl.
*E02F 9/26* (2006.01)
*G01S 19/28* (2010.01)
*G01S 19/54* (2010.01)

(52) U.S. Cl.
CPC .............. *E02F 9/261* (2013.01); *G01S 19/28* (2013.01); *G01S 19/54* (2013.01)

(58) Field of Classification Search
None
See application file for complete search history.

(56) References Cited

U.S. PATENT DOCUMENTS

| 5,589,836 A | 12/1996 | Noetzel |
| 2007/0236387 A1 | 10/2007 | Monnerat |
| (Continued) | | |

FOREIGN PATENT DOCUMENTS

| CN | 101013153 A | 8/2007 |
| CN | 105636658 A | 6/2016 |
| (Continued) | | |

OTHER PUBLICATIONS

Chinese Office Action received in corresponding Chinese Application No. 202080004684.6 dated Jan. 4, 2022.
(Continued)

*Primary Examiner* — Maceeh Anwari
*Assistant Examiner* — Aarron E Santos
(74) *Attorney, Agent, or Firm* — MATTINGLY & MALUR, PC

(57) ABSTRACT

A hydraulic excavator includes a receiver configured to calculate a position and an azimuth angle of an upper swing structure on the basis of satellite signals received by two GNSS antennae and a controller configured to calculate a distal end position of a bucket on the basis of the position and the azimuth angle of the upper swing structure calculated by the receiver. The controller sets, on the basis of installation positions of the two GNSS antennae, a movable range of a front work device and an inclination angle and an azimuth angle of the upper swing structure, a range within which the front work device possibly becomes an obstacle to reception of satellite signals by each of the two GNSS antennae as a mask range. The receiver is configured to calculate the position and the azimuth angle of the upper swing structure on the basis of the satellite signals transmitted from the remaining satellites other than the satellites positioned in the mask range.

6 Claims, 15 Drawing Sheets

(56) References Cited

U.S. PATENT DOCUMENTS

| | | | |
|---|---|---|---|
| 2010/0283674 A1 | 11/2010 | Kirk | |
| 2013/0158784 A1* | 6/2013 | Fukano | E02F 9/2033 |
| | | | 701/34.4 |
| 2015/0330060 A1 | 11/2015 | Seki et al. | |
| 2016/0238711 A1* | 8/2016 | Matthews | G01S 19/24 |
| 2016/0258759 A1 | 9/2016 | Matthews | |

FOREIGN PATENT DOCUMENTS

| | | |
|---|---|---|
| EP | 3064964 A1 | 9/2016 |
| JP | 04-62490 A | 2/1992 |
| JP | 07-325141 A | 12/1995 |
| JP | 2003-004838 A | 1/2003 |
| JP | 2010-534849 A | 11/2010 |
| JP | 2016-079677 A | 5/2016 |
| JP | 2016-188792 A | 11/2016 |

OTHER PUBLICATIONS

International Preliminary Report on Patentability received in corresponding International Application No. PCT/JP2020/004152 dated Sep. 16, 2021.
International Search Report of PCT/JP2020/004152 dated Apr. 7, 20201.

* cited by examiner

FIG. 12

| MACHINE BODY REFERENCE AZIMUTH ANGLE (DEGREE) | FRONT SCREENING ELEVATION ANGLE αft (DEGREE) |
|---|---|
| 0 | 0 |
| 5 | 0 |
| 10 | 30 |
| 15 | 35 |
| 20 | 50 |
| 25 | 40 |
| 30 | 0 |
| 35 | 0 |
| ・ | ・ |
| ・ | ・ |
| ・ | ・ |
| 355 | 0 |

WORK MACHINE

TECHNICAL FIELD

The present invention relates to a work machine such as a hydraulic excavator, and particularly to a work machine that incorporates a position measurement system that uses satellite signals of satellites to measure an absolute position of a monitor point set to a work device in a three-dimensional space.

BACKGROUND ART

In recent years, at a construction work site, it is popular to measure the position of a predetermined point (monitor point) set to a work machine, using a three-dimensional position measurement system such as a GNSS (Global Navigation Satellite System) and to perform work management. A typical example of the monitor point is a point set to a work device provided on a work machine, for example, a bucket distal end of a hydraulic excavator. If the position of the bucket distal end can be measured, by comparing measurement data by the measurement with terrain data or target shape data set in advance, a work progress situation during construction can be grasped, and accordingly, this enables management and control during construction. Further, by creating finished form data (for example, excavation terrain data) from a history of measurement data till the end of construction, construction management can be performed also after the construction.

Incidentally, for example, in a hydraulic excavator, a work device that can be positioned higher than a GNSS antenna such as a boom, an arm, and a bucket or an obstacle around the work device becomes an obstacle to a signal (GNSS signal, satellite signal) transmitted from a GNSS satellite. Therefore, there is the possibility that the GNSS antenna may receive a GNSS signal as a diffracted wave or a reflected wave called multipath. If a diffracted wave or a reflected wave is used in position measurement of a monitor point, the possibility that a position measurement result may include an error is high. As a solution method for eliminating the influence of the multipath, for example, a solution method disclosed in Patent Document 1 is available.

Patent Document 1 discloses a positioning apparatus that includes a reception device receiving signals from a plurality of transmitters (a plurality of satellites) and that decides transmitter positions of the individual transmitters (the plurality of satellites). Then, the positioning apparatus calculates transmitters (a plurality of satellites) from which signals can be received directly on the basis of the positions of the transmitters, a position of the positioning apparatus decided in a preceding operation cycle, and multipath information, and decides the present position of the positioning apparatus, ignoring the transmitters from which signals cannot be received directly.

PRIOR ART DOCUMENT

Patent Document

Patent Document 1: JP-2010-534849-T

SUMMARY OF THE INVENTION

Problem to be Solved by the Invention

In the technology of Patent Document 1 described above, it is possible to reduce the influence of diffraction and reflection by an obstacle. However, in a work machine that repeats a series of operations such as excavation, swing, and dumping of loaded soil like a hydraulic excavator, the relative positions of the work machine and an obstacle around the work machine can change readily according to a change in posture of the work device or an upper swing structure. Therefore, there is the possibility that the combination of satellite signals to be used for position measurement may constantly switch. The position measurement by the GNSS has a subject that, if satellites to be used for position measurement switch, the position measurement error increases.

The present invention has been made to solve the subject described above, and it is an object of the present invention to provide a work machine that can prevent accuracy degradation in GNSS position measurement even if the posture of a work device or an upper swing structure changes during work of the work machine.

Means for Solving the Problem

In order to achieve the object described above, according to the present invention, there is provided a work machine that includes a lower track structure, an upper swing structure swingably provided on the lower track structure and configuring a machine body together with the lower track structure, a work device rotatably provided on the upper swing structure, an inclination measurement device provided on the machine body, an angle measurement device provided on the work device, a three-dimensional position measurement device that calculates a three-dimensional position and a direction of itself on the basis of satellite signals of satellites, and a controller that calculates, on the basis of information from the inclination measurement device, the angle measurement device, and the three-dimensional position measurement device, a three-dimensional position and a posture of the machine body, and a three-dimensional position of a predetermined position of the work device, in which the three-dimensional position measurement device receives satellite signals of satellites, selects, from among the satellites whose satellite signals are received, the satellites to be used for calculation of a three-dimensional position and a direction of the three-dimensional position measurement device, and calculates a three-dimensional position and a direction of the three-dimensional position measurement device on the basis of the satellite signals of the selected satellites, and the work machine further includes a storage instruction device for instructing to store a combination of the satellites selected by the three-dimensional position measurement device. The controller stores, when the instruction is inputted through the storage instruction device, the combination of the satellites selected by the three-dimensional position measurement device as satellite selection information, and transmits, when a predetermined changing condition is satisfied, the satellite selection information to the three-dimensional measurement device, and the three-dimensional position measurement device preferentially selects, when the three-dimensional position measurement device receives the satellite selection information from the controller, the satellites included in the satellite selection information from among the satellites from which the satellite signals are received.

Advantages of the Invention

According to the present invention, even if the posture of the work device or the upper swing structure changes during work, switching of the satellite signals to be used in calculation of GNSS position measurement, deterioration of the position measurement accuracy by the GNSS can be suppressed, and as a result, the work accuracy can be improved.

BRIEF DESCRIPTION OF THE DRAWINGS

FIG. 12 is a view depicting an example of a relation between a machine body reference azimuth angle and a front screening elevation angle αft.

MODE FOR CARRYING OUT THE INVENTION

Figure 1:
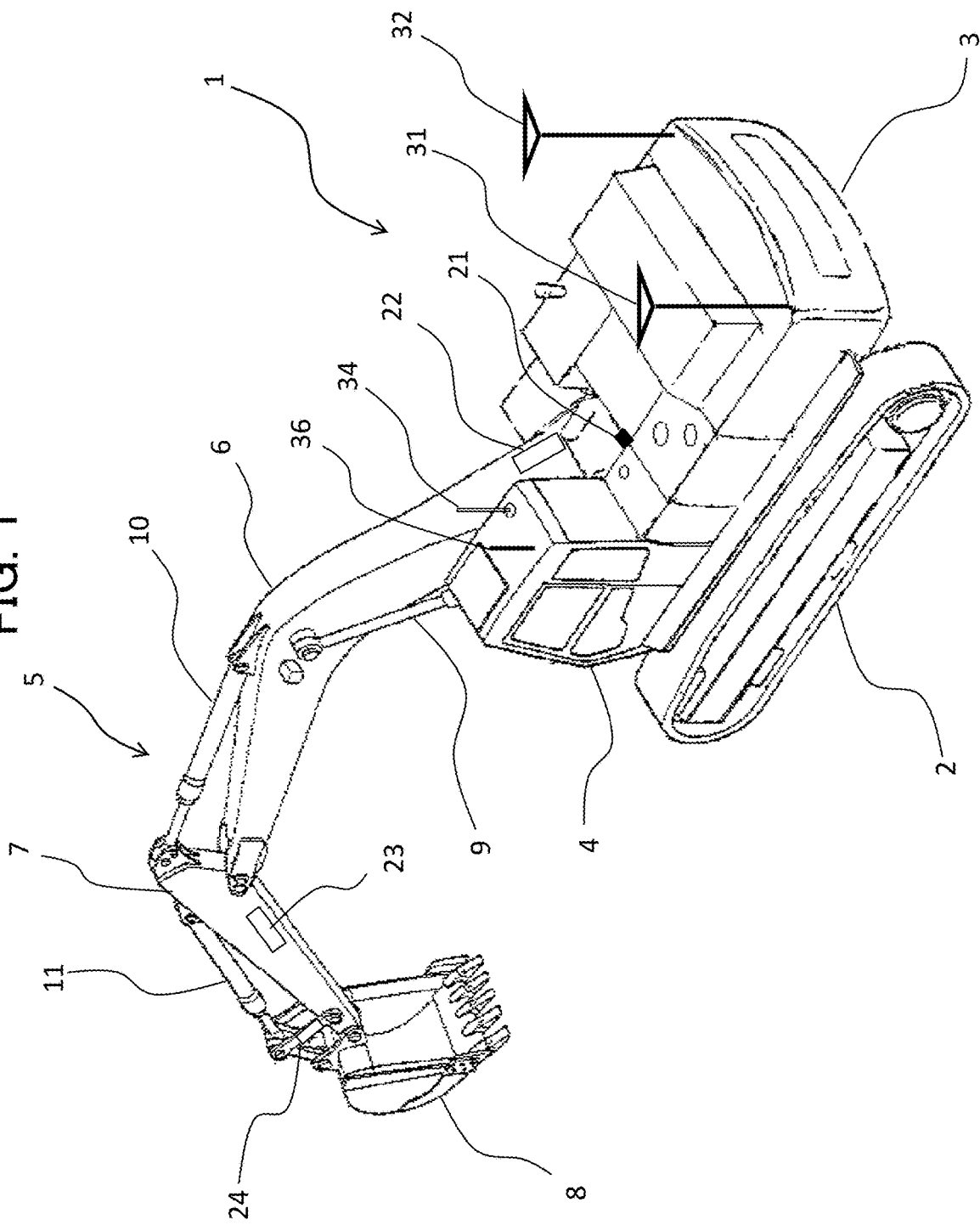
FIG. 1 is a view depicting an appearance of a hydraulic excavator according to an embodiment of the present invention.

In the following, an embodiment of the present invention is described with reference to the drawings. The present embodiment is an embodiment when the present invention is applied to a crawler type hydraulic excavator as a construction machine and a monitor point (control point) is set to a bucket distal end of the hydraulic excavator. It is to be noted that, in the figures, equivalent members are denoted by the same reference numerals and overlapping description is suitably omitted.

FIG. 1 is a view depicting an appearance of the hydraulic excavator of the present embodiment.

Referring to FIG. 1, the hydraulic excavator 1 includes a lower track structure 2 that travels by crawlers driven by traveling hydraulic motors (not depicted), an upper swing structure 3 attached for swinging motion on the lower track structure 2 and configuring a machine body together with the lower track structure 2, a cab 4 provided on the upper swing structure 3, and a front work implement (work device) 5 attached to the upper swing structure 3. The upper swing structure 3 is driven to swing leftward and rightward by a swing hydraulic motor (not depicted). The front work implement 5 is an articulated type work apparatus including a boom 6 rotatably provided in upward and downward directions on the upper swing structure 3, an arm 7 rotatably provided in the upward and downward directions at a distal end of the boom 6, and a bucket (attachment) 8 rotatably provided in the upward and downward directions at a distal end of the arm 7. The boom 6, the arm 7, and the bucket 8 are driven by elongating or contracting a boom cylinder 9, an arm cylinder 10, and a bucket cylinder 11, respectively. Each of the boom 6, the arm 7, and the bucket 8 is sometimes referred to as a front member.

Also, a machine body IMU 21 for detecting an inclination angle (pitch angle) of the upper swing structure 3 with respect to a predetermined plane (for example, a horizontal plane) is attached to the upper swing structure 3. A boom IMU 22 for detecting an angle of the boom 6 (boom angle) with respect a predetermine plane (for example, the horizontal plane) is attached to the boom 6. An arm IMU 23 for detecting an angle of the arm 7 (arm angle) with respect to a predetermined plane (for example, the horizontal plane) is attached to the arm 7. A bucket IMU 24 for detecting an angle of the bucket 8 (bucket angle) with respect to a predetermined plane (for example, the horizontal plane) is attached to the bucket 8. It is to be noted that, in the present specification, the boom IMU 22, the arm IMU 23, and the bucket IMU 24 are sometimes referred to collectively as front IMUs (refer to FIG. 2).

Further, on the upper swing structure 3, two GNSS antennae 31 and 32 for receiving satellite signals (navigation signals) transmitted from a plurality of GNSS satellites and an RTK correction data receiving antenna 34 for receiving RTK correction data (hereinafter described) from a reference station are provided. The two GNSS antennae 31 and 32 are installed on the left and right of a rear portion of the swing structure displaced from the center of swing of the upper swing structure 3.

Figure 2:
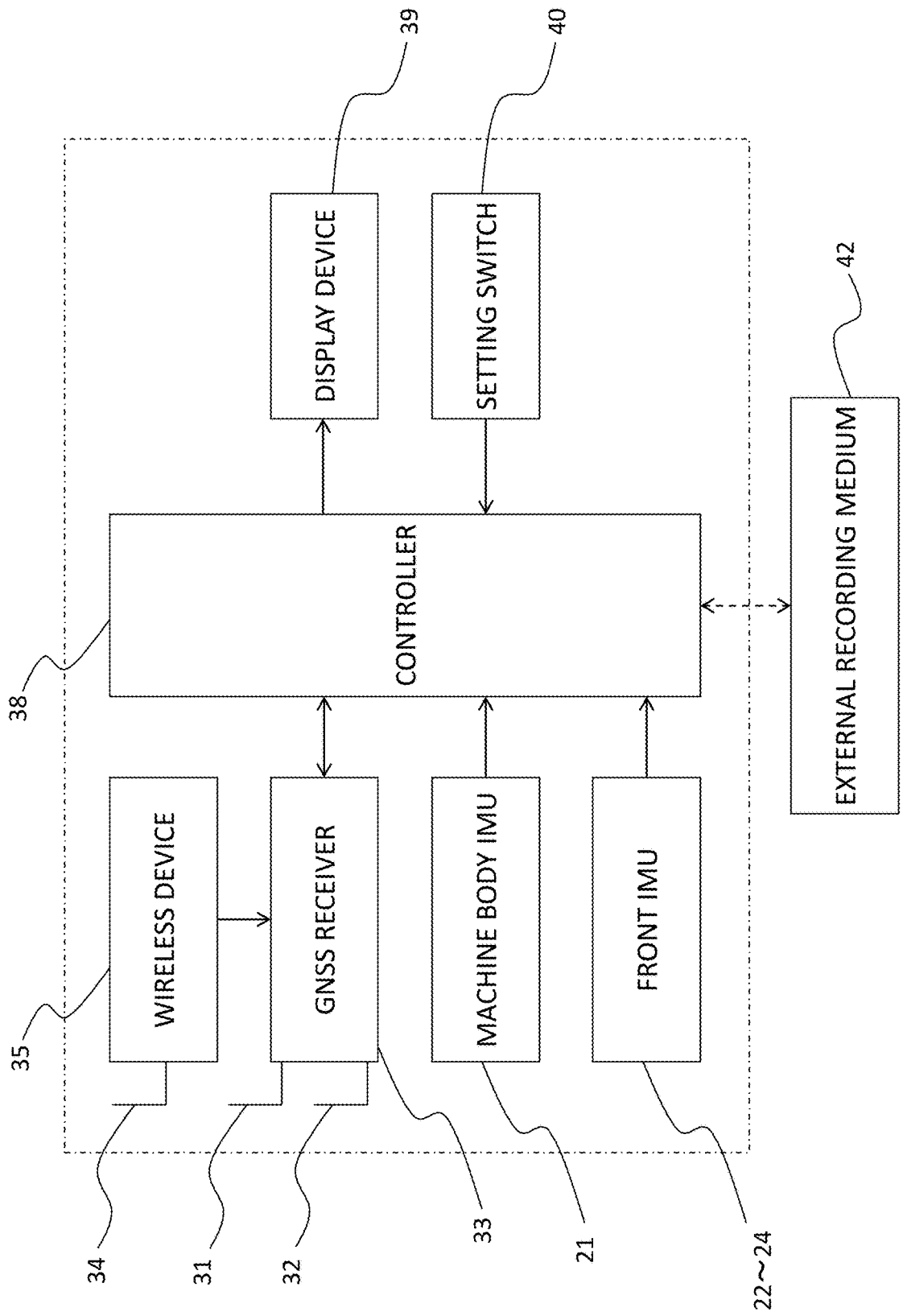
FIG. 2 is a block diagram depicting an apparatus configuration of a position measurement system incorporated in the hydraulic excavator.

FIG. 2 is a block diagram of a position measurement system incorporated in the hydraulic excavator 1. The position measurement system 200 depicted in FIG. 2 includes a wireless device 35, a GNSS receiver 33, a controller 38, a display device 39 and a setting switch 40.

The wireless device 35 receives RTK correction data (hereinafter described) from a reference station through the RTK correction data receiving antenna 34 and outputs the RTK correction data to the GNSS receiver 33.

The GNSS receiver 33 calculates the position of the GNSS antenna 31 that is one of the two GNSS antennae 31 and 32 and a vector from the GNSS antenna 31 that is one of the two GNSS antennae 31 and 32 to the other GNSS antenna 32 on the real time basis on the basis of RTK correction data inputted from the wireless device 35 and signals from GNSS satellites received by the GNSS antennae 31 and 32. Accordingly, the position and the azimuth angle of the upper swing structure 3 in a geographic coordinate system (global coordinate system) can be calculated.

The controller 38 receives the position and vector data calculated by the GNSS receiver 33 and angle data from the IMUs 21 to 24 as inputs thereto and calculates a position and an azimuth angle of the upper swing structure 3 and a position of the distal end (monitor point) of the bucket 8. The controller 38 includes, as hardware, an arithmetic processing unit (for example, a CPU), a storage device (for example, a semiconductor memory such as a ROM and a RAM), and an interface (inputting/outputting device). In the controller 38, a program (software) stored in advance in the storage device is executed by the arithmetic processing unit, and arithmetic processing is performed by the arithmetic processing unit on the basis of data prescribed in the program and data inputted from the interface. Then, a signal (calculation result) is outputted from the interface to the outside. It is to be noted that, though not depicted, the GNSS receiver 33 can also include hardware similar to that of the controller 38.

The display device (monitor) 39 displays a calculation result of the controller 38 and various kinds of data acquired by utilizing the calculation result.

The setting switch (masking range reset switch) 40 is connected to the controller 38. The setting switch 40 is a switch for cancelling (deleting) all mask ranges (hereinafter described) set at that time. The setting switch 40 is depressed at a timing desired by an operator, and as a result, the controller 38 deletes all mask ranges. Details of setting of a mask range and a scene in which the setting switch 40 is utilized are hereinafter described.

In addition, an external recording medium (external storage device) 42 such as a semiconductor memory can be connected to the controller 38. The external recording medium 42 has stored therein terrain data including present terrain data and target terrain data (also referred to as design data). The operator connects the external recording medium 42 to the controller 38 at a predetermined timing such as at the time of system startup and downloads, when necessary, data into a storage device in the controller 38. Then, at the time of end of a work or the like, for example, present terrain data after the work created from locus data on the bucket distal end position while the system is operating is recorded into the external recording medium 42 and is used in work management.

Figure 3:
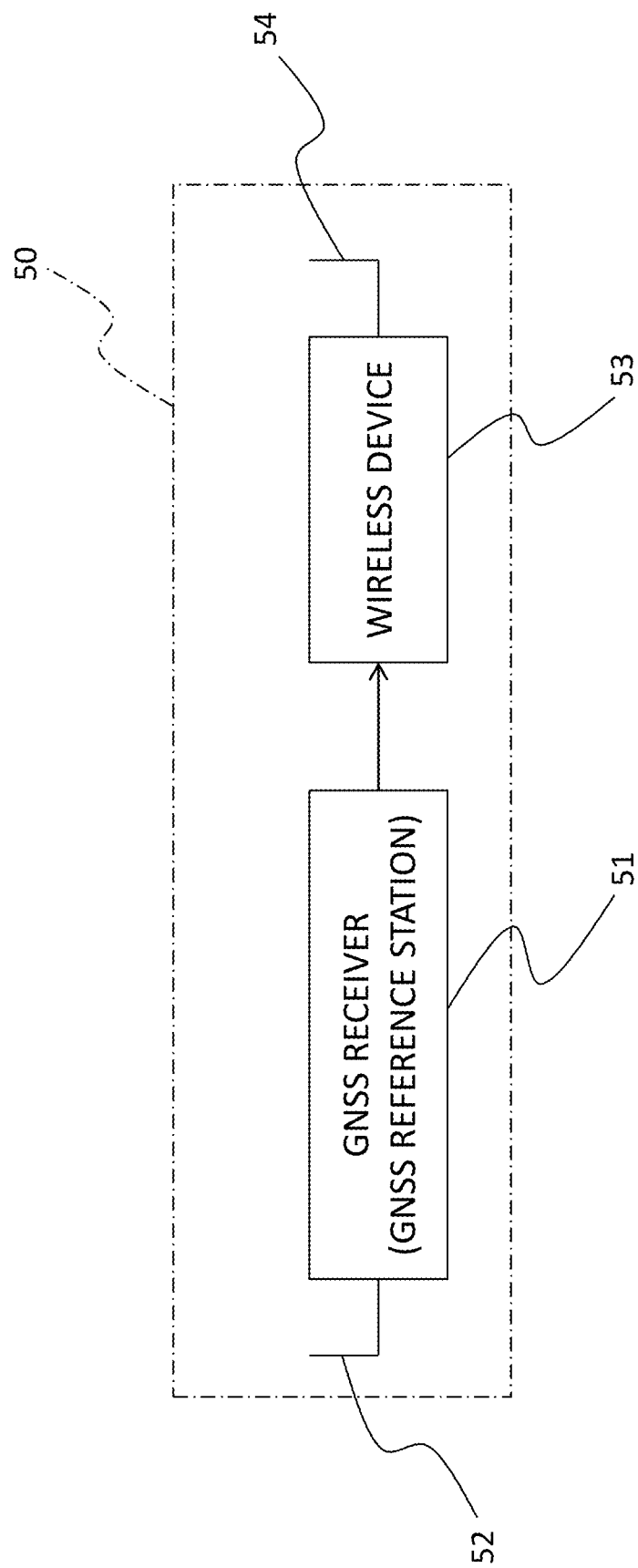
FIG. 3 is a block diagram depicting an apparatus configuration of an office side system having a role as a GNSS reference station.

FIG. 3 is a block diagram of an office side measurement system (reference station system) 50 having a role as a GNSS reference station.

Referring to FIG. 3, the office side measurement system 50 includes a GNSS antenna 52, a GNSS receiver 51, a wireless device 53, and a wireless antenna 54.

The GNSS antenna 52 is an antenna for receiving satellite signals (navigation signals) transmitted from a plurality of GNSS satellites.

The GNSS receiver 51 functions as a GNSS reference station (in the following description, the GNSS receiver 51 is sometimes represented as a GNSS reference station 51), and generates, on the basis of data on a three-dimensional position measured in advance (for example, the position of the GNSS antenna 52) and satellite signals received by the GNSS antenna 52, correction data for allowing the GNSS receiver 33 of the hydraulic excavator 1 to perform RTK (real time kinematic) measurement, and outputs the correction data to the wireless device 53.

The wireless device 53 transmits the correction data inputted from the GNSS receiver 51 to the wireless device 35 of the hydraulic excavator 1 through the wireless antenna 54.

Now, an overview of operation of the position measurement system 200 according to the present embodiment is described.

In the present embodiment, in order to perform position measurement with high accuracy, RTK measurement is performed by the GNSS receiver 33 depicted in FIG. 2. To this end, the GNSS reference station 51 that creates correction data depicted in FIG. 3 is first required. The GNSS reference station 51 creates correction data for RTK measurement on the basis of the position data on the GNSS antenna 52 three-dimensionally measured in advance as described hereinabove and satellite signals from a plurality of GNSS satellites received by the GNSS antenna 52, and transmits the created correction data by the wireless device 53 in a fixed cycle through the antenna 54.

On the other hand, the GNSS receiver 33 on the hydraulic excavator 1 side depicted in FIG. 2 performs RTK measurement on the three-dimensional position of the GNSS antenna 31 and the vector from the GNSS antenna 31 to the GNSS antenna 32 on the basis of the correction data received from the wireless device 35 through the antenna 34 and satellite signals from a plurality of GNSS satellites received by the GNSS antennae 31 and 32. Due to this RTK measurement, the three-dimensional position of the GNSS antenna 31 in the geographic coordinate system and the vector from the GNSS antenna 31 to the GNSS antenna 32 are measured with high accuracy. Then, the measured three-dimensional position data and vector data are inputted to the controller 38.

Meanwhile, the inclination angle of the hydraulic excavator 1 (upper swing structure 3) (namely, a pitch angle and a roll angle) and the angles of the boom 6, the arm 7, and the bucket 8 are measured by the IMUs 21 to 24 and are similarly inputted to the controller 38.

The controller 38 performs general vector calculation and coordinate transformation on the basis of the various kinds of inputted data to calculate a position and a posture (including an azimuth angle) of the upper swing structure 3 and the position of the distal end (monitor point) of the bucket 8 in a predetermined coordinate system (for example, a site coordinate system set to the ground of the work site). In addition, it is also possible for the controller 38 to display an image of the bucket and a target terrain on the screen of the display device 39 on the basis of the calculated position and posture of the upper swing structure 3 and the calculated position of the distal end of the bucket 8, and the target terrain data inputted from the external recording medium 41 to notify the operator of the work situation.

Now, deterioration of reproducibility of position measurement by the GNSS receiver 33, which is the subject of the present invention, is described with reference to FIGS. 4 to 9.

Figure 4:
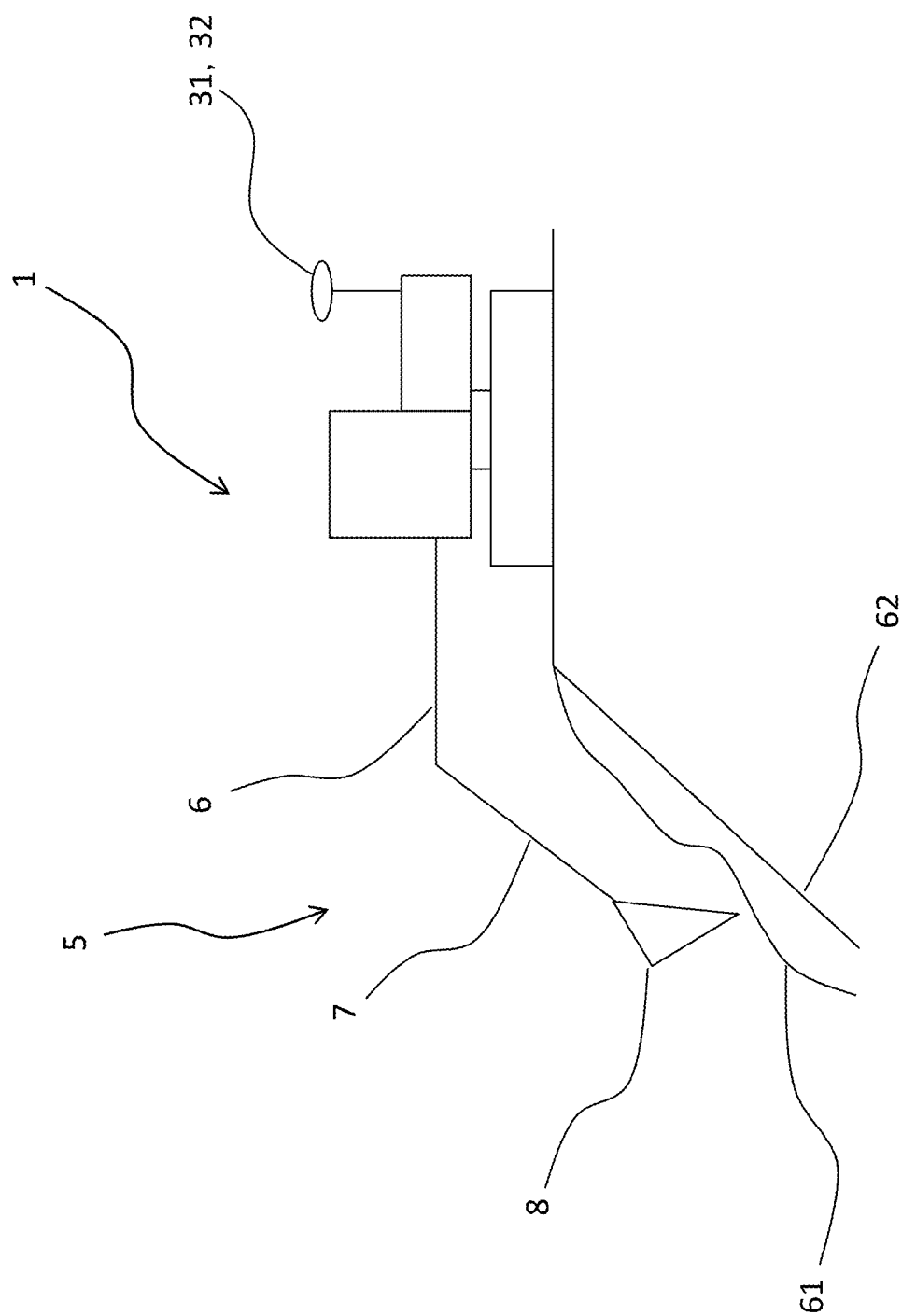
FIG. 4 is a view schematically depicting a posture of the hydraulic excavator upon excavation operation.

FIG. 4 schematically depicts a posture of the hydraulic excavator 1 upon excavation operation. Referring to FIG. 4, the hydraulic excavator 1 performs a generally-called slope face forming work. The image depicted in FIG. 4 is generally equivalent to information displayed on the display device 39, and the operator will perform an excavation operation of the hydraulic excavator 1 on the basis of this information such that a present terrain 61 approaches a target terrain 62.

Figure 5:
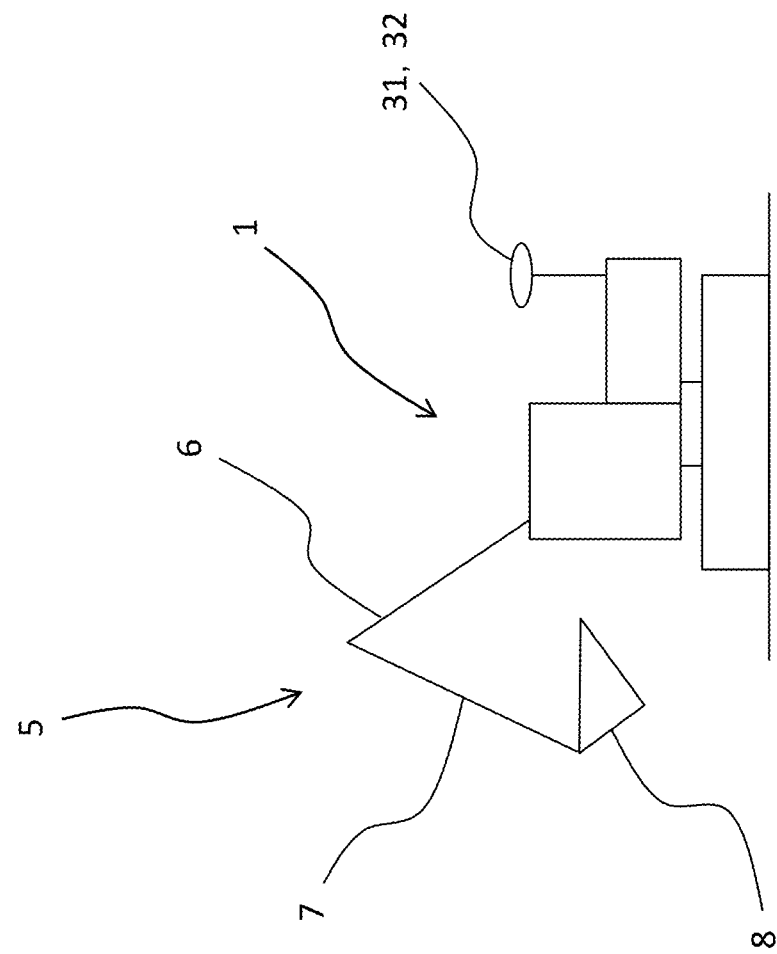
FIG. 5 is a view schematically depicting a posture of the hydraulic excavator upon swing operation.

FIG. 5 schematically depicts a posture of the hydraulic excavator 1 upon swing operation. As depicted in FIG. 5, usually the swing operation is performed in a state in which the boom 6 is raised after excavation operation ends, the arm 7 and the bucket 8 are moved inward, and a clearance between the bucket 8 and the ground is secured. Then, the arm 7 and the bucket 8 are dumped at a soil-dumping position to release the excavated soil down to a predetermined position. Thereafter, swing operation for returning to the excavation position is performed, and the excavation operation is repeated.

Figure 6:
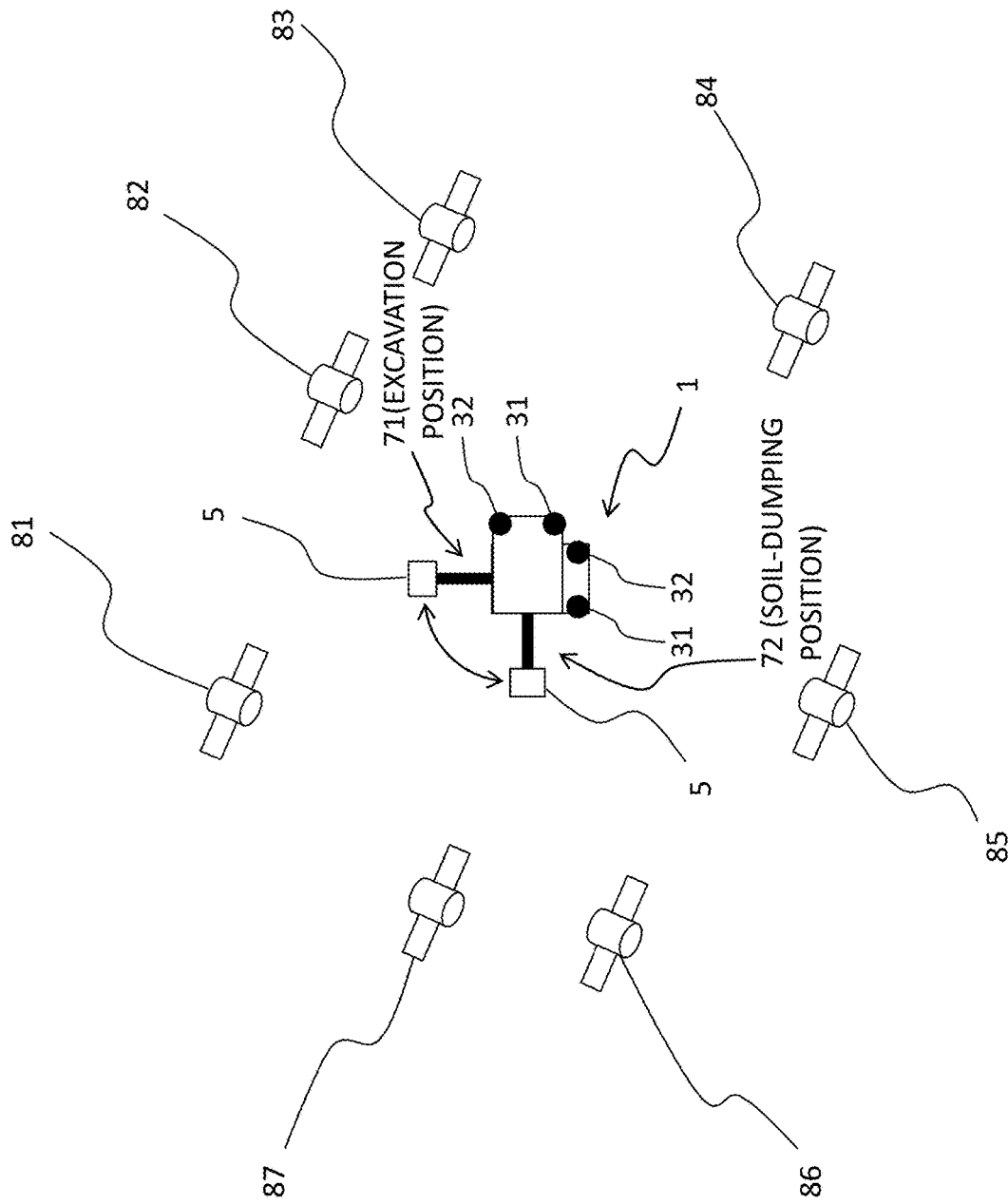
FIG. 6 is a view schematically depicting an excavation position and a soil-dumping position of the hydraulic excavator and arrangement of GNSS satellites existing in a sky view of a GNSS antenna at that time.

FIG. 6 schematically depicts an excavation position and a soil-dumping position of the hydraulic excavator 1 and arrangement of GNSS satellites 81 to 87 existing within a sky view of the GNSS antennae 31 and 32 at that time. Referring to FIG. 6, a state in which the front work implement 5 is directed to the upper side is defined as an excavation position 71, and a state in which the front work implement 5 is directed to the left side is defined as a soil-dumping position 72. Also, it is assumed that movement from the excavation position 71 to the soil-dumping position 72 is performed by left swing and movement from the soil-dumping position 72 to the excavation position 71 is performed by right swing.

In position measurement by the GNSS, the GNSS receiver 33 performs various condition decisions regarding the quality of satellite signals from GNSS satellites received by the GNSS antennae 31 and 32, arrangement of the GNSS satellites from which satellite signals are received, and so forth to select GNSS satellites (satellite signals) to be used in position calculation.

Here, the arrangement of GNSS satellites is evaluated with a numerical value called DOP (Dilution of Precision), and, for example, in such a case that GNSS satellites are distributed so as to be clustered to one direction of the sky view, the DOP is bad (the numerical value is high). As a result, the position accuracy in calculation is deteriorated. In contrast, where GNSS satellites are distributed without being clustered to the one direction in the sky view, the DOP is good (the numerical value is low), and the position accuracy in calculation is improved. This arises from that position measurement by the GNSS is a measurement system that applies triangulation.

Figure 7:
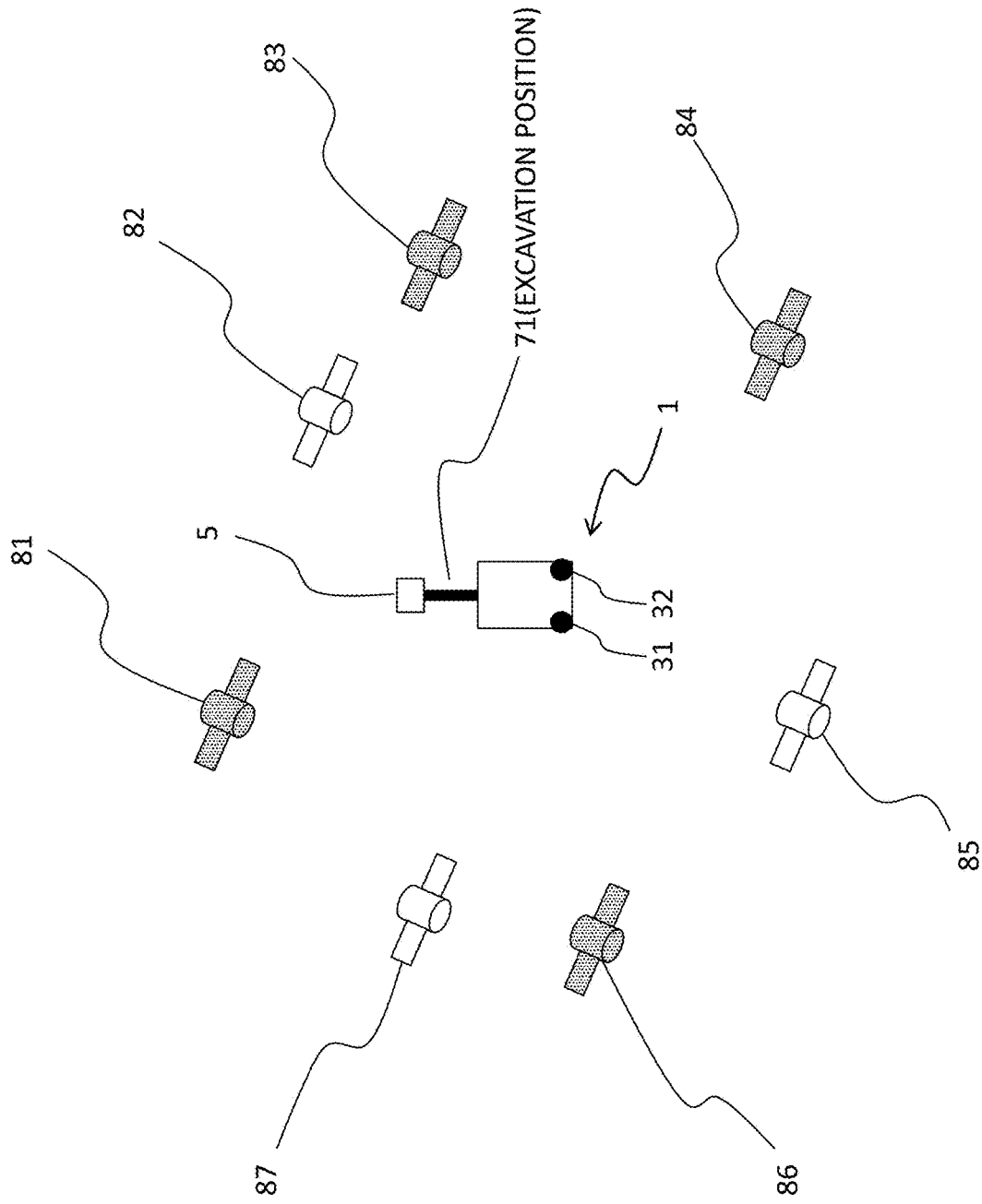
FIG. 7 is a view schematically depicting an excavation position of the hydraulic excavator, arrangement of GNSS satellites existing in a sky view of the GNSS antenna at that time, and a combination of GNSS satellites used in position calculation.

Therefore, where the GNSS satellites 81 to 87 which can be caught are arranged in such arrangement as indicated in FIG. 6, as GNSS satellites to be used for position calculation at the excavation position 71, for example, the satellites 81, 83, 84, and 86 indicated with hatched lines in FIG. 7 are selected.

However, when the excavation operation of the hydraulic excavator 1 ends and the hydraulic excavator 1 takes such a swing posture as depicted in FIG. 5 and swings leftward from the excavation position 71 to the soil-dumping position 72, then since the front work implement 5 passes between the GNSS antennae 31 and 32 and the GNSS satellites 81, 86, and 87, the satellite signals of the GNSS satellites 81, 86, and 87 are blocked by the front work implement 5.

Figure 8:
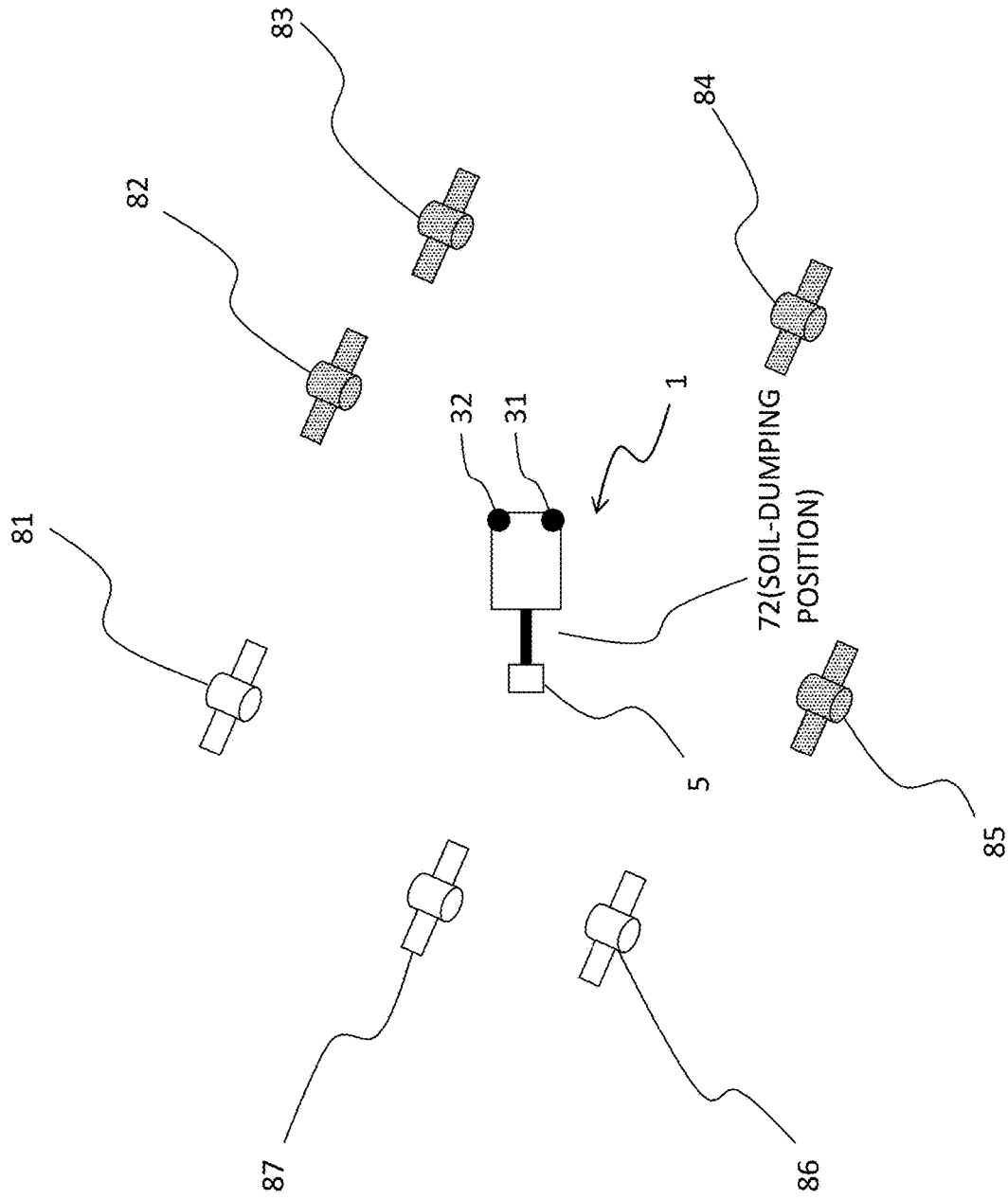
FIG. 8 is a view schematically depicting a soil-dumping position of the hydraulic excavator, arrangement of GNSS satellites existing in a sky view of the GNSS antenna at that time, and a combination of GNSS satellites used in position calculation.

As a result, at the time of position calculation of the soil-dumping position 72, for example, the GNSS satellites 82 to 85 indicated with hatched lines in FIG. 8 are selected, and the GNSS satellites sometimes change from those of the combination selected at the excavation position 71 in FIG. 7.

Figure 9:
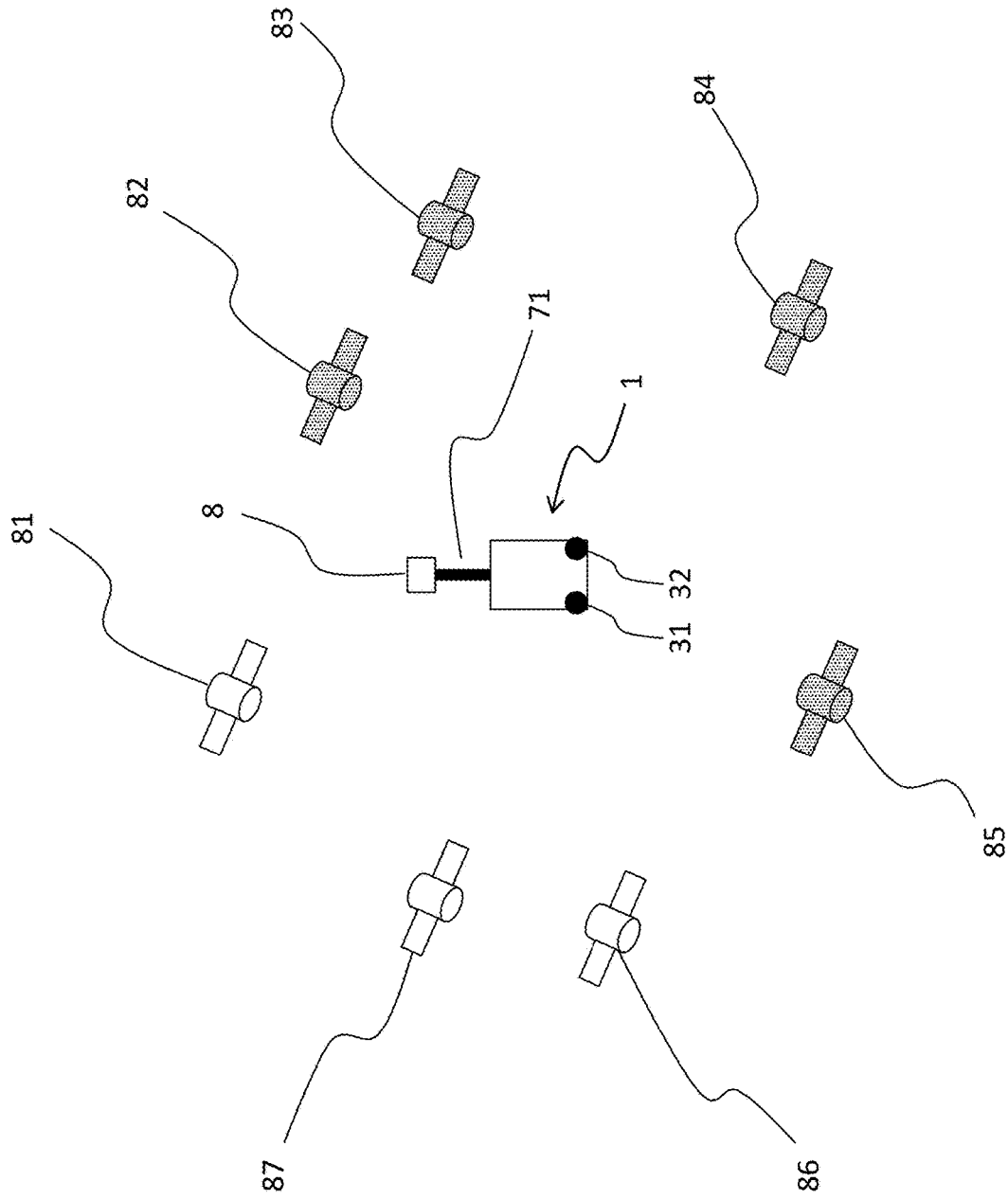
FIG. 9 is a view schematically depicting an excavation position of the hydraulic excavator, arrangement of GNSS satellites existing in a sky view of the GNSS antenna at that time, and a combination of GNSS satellites used in position calculation.

Further, the hydraulic excavator 1 returns to the excavation position 71 by right swing and repeats the excavation operation. However, while the hydraulic excavator 1 swings rightward from the soil-dumping position 72 to the excavation position 71, since the satellite signals of the GNSS satellites 82 to 85 are not blocked by the front work implement 5, the combination of GNSS satellites to be used for position calculation is kept to be the GNSS satellites 82 to 85 also at the excavation position 71 as depicted in FIG. 9. Consequently, the change from the combination of the GNSS satellites 81, 83, 84, and 86 having been selected at the time of the excavation operation in the preceding operation cycle sometimes remains.

In position measurement by the GNSS, not only DOP but also error factors that are subtly different among GNSS satellites, such as a clock error among GNSS satellites or an error of orbit information are involved, and even if the hydraulic excavator 1 is positioned at the same position, if the combination of GNSS satellites to be used for position calculation differs, a displacement appears in position calculation results, resulting in the possibility that the reproducibility of position calculation may be deteriorated.

If the reproducibility of position calculation by the GNSS receiver 33 is deteriorated in this manner, then there is the possibility that the positional relation between the bucket 8 and the target terrain 62 displayed on the display device 39 may become different before and after excavation operation, and as a result, such a problem that the finished form becomes discontinuous may possibly occur.

Figure 10:
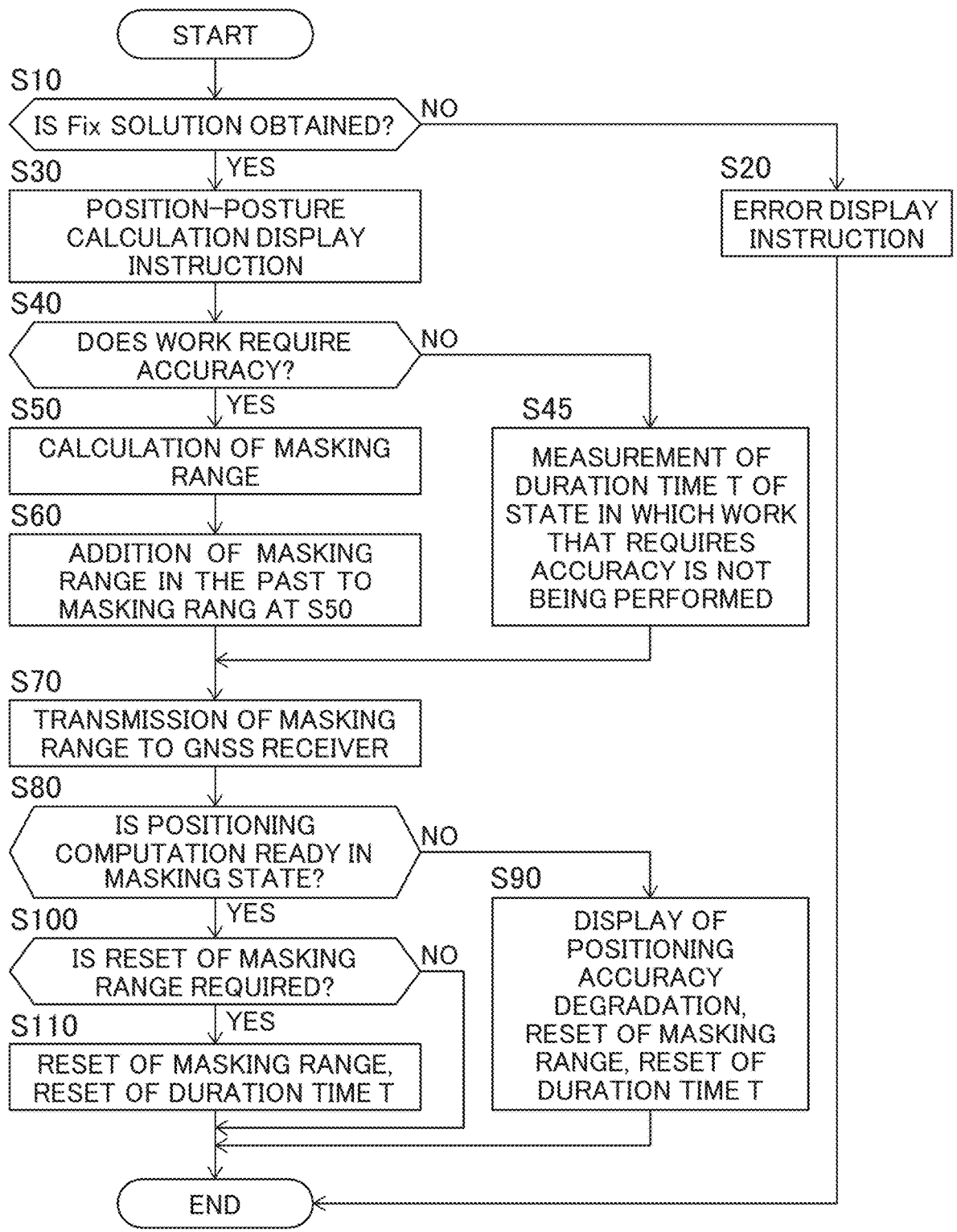
FIG. 10 is a flow chart depicting processing of a controller.

Selection logic of satellites to be used which is to be executed by the controller 38 in a method for solving the problem just described is described with reference to a flow chart of FIG. 10. FIG. 10 is a flow chart depicting an example of the satellite selection logic to be executed by the controller 38. It is to be noted that the flow chart of FIG. 10 is calculated repeatedly in a fixed cycle (for example, 100 ms).

At step S10, the controller 38 decides whether a Fix solution is obtained by RTK based on information from the GNSS receiver 33. Whether or not this state is achieved can be decided by referring to, for example, a GGA sentence of an NMEA message from the GNSS receiver 33.

When it is decided at step S10 that a Fix solution is not obtained, the controller 38 decides that correct position measurement has not been performed, and the processing advances to step S20 at which the controller 38 displays on the display device 39 that correct measurement is not performed and returns to an initial state (waits till a next control cycle). On the other hand, when it is decided at step S10 that a Fix solution is obtained, the processing advances to step S30.

At step S30, the controller 38 performs, on the basis of a three-dimensional position of the GNSS antenna 31 inputted from the GNSS receiver 33, vector information from the GNSS antenna 31 to the GNSS antenna 32, and angle information inputted from the IMUs 21 to 24, general vector calculation and coordinate transformation to calculate the position and the posture of the upper swing structure 3 and the position of the distal end of the bucket 8 in the site coordinate system. Then, the controller 38 displays posture information of the bucket 8, a present terrain generated on the basis of terrain data acquired from the external recording medium 42 and information of a target shape on the display device 39.

Figure 11:
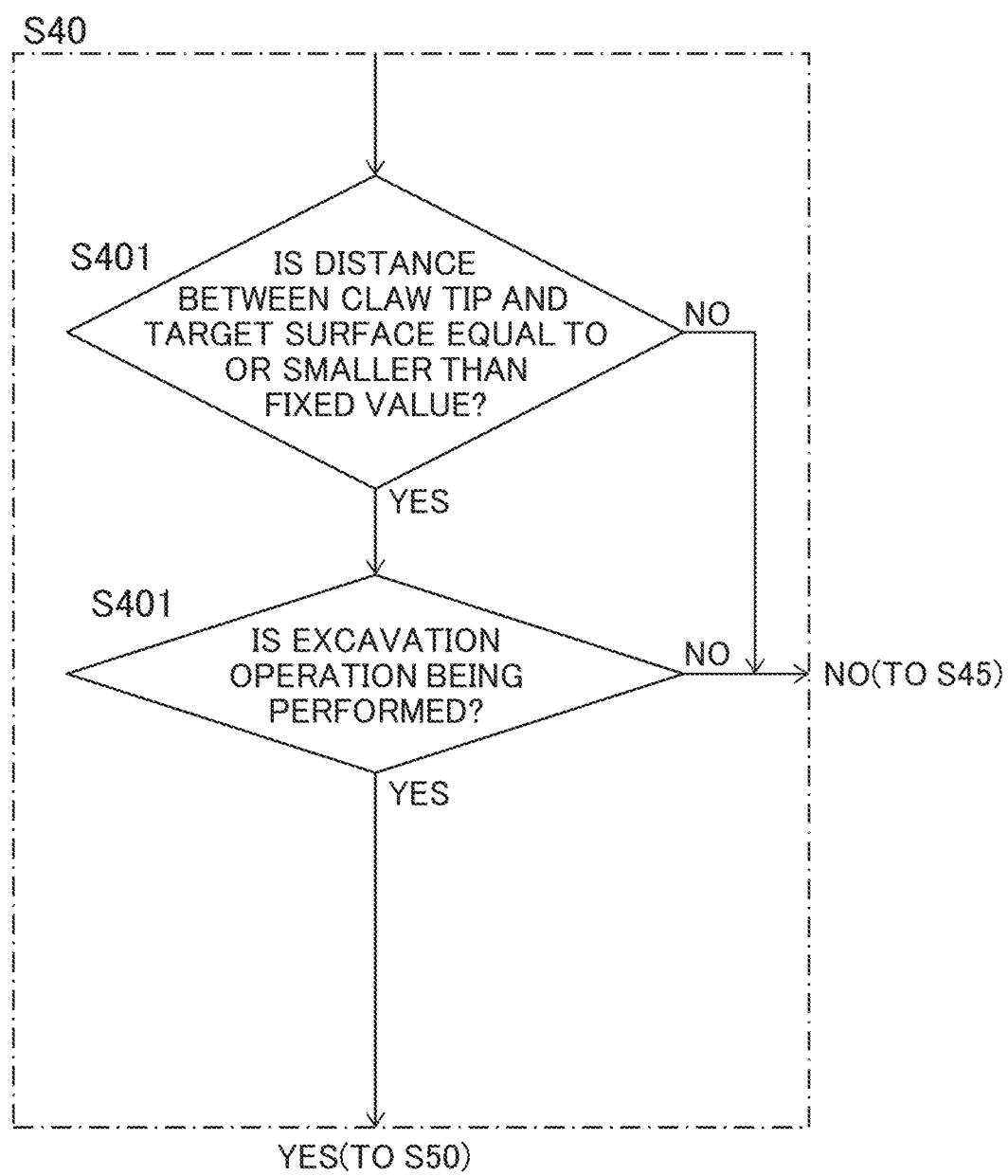
FIG. 11 is a flow chart depicting one of particular examples of a process executed at step S40 in FIG. 10.

Then, the processing advances to step S40 at which the controller 38 decides by a decision method depicted in FIG. 11 whether or not the hydraulic excavator 1 is performing a work that requires accuracy. Here, the logic (decision logic) of the controller 38 for deciding whether or not the hydraulic excavator 1 is performing an excavation work that requires accuracy at step S40 is described with reference to FIG. 11. FIG. 11 is a flow chart depicting one of particular examples of the process performed at step S40.

First at step S401, the controller 38 decides whether or not the distance between the front work implement 5 and a target surface (target surface distance) is equal to or smaller than a predetermined value d1. As the target surface distance, for example, the distance between the bucket distal end (claw tip) position and the target surface can be used. In this case, a perpendicular line is drawn from the position of the bucket distal end (monitor point) calculated at step S30, a point at which the perpendicular line crosses with the target terrain surface defined by the target terrain data is calculated, and the distance between the point and the bucket distal end can be determined as the target surface distance. When the target surface distance is greater than the predetermined value d1, the controller 38 decides that, because the bucket distal end is at a position spaced away from the target surface, an excavation work that requires accuracy is not being performed. On the other hand, when it is the decision that the target surface distance is equal to or smaller than the predetermined value d1, the processing advances to step S402.

At step S402, the controller 38 decides whether or not an excavation operation is inputted to an operation device (not depicted) for operating the front work implement 5 (the boom 6, the arm 7, and the bucket 8) installed in the cab 4. Whether or not an excavation operation is inputted is decided here depending upon whether or not the arm 7 (arm cylinder 10) is being driven. Whether or not the arm 7 (arm cylinder 10) is being driven can be decided, for example, by detecting the operation pilot pressure of the arm 7 outputted from the operation device by a pressure sensor and checking whether or not the detected pressure exceeds a predetermined value.

When an affirmative result is obtained both at steps S401 and S402 in this manner, the controller 38 deems that the hydraulic excavator 1 is performing an excavation work that requires accuracy. In this manner, even if the distance between the bucket distal end and the target surface is equal to or smaller than the predetermined value d1 at step S401, when it is decided at step S402 that an excavation operation is not being performed, for example, in such a state in which the arm 7 stops with the distal end of the bucket 8 contacting with the terrain excavated according to the target surface, a decision that an excavation work is not being performed is made. Therefore, a mask range hereinafter described can be prevented from being widened more than necessary. Further, when it is decided at step S401 that the target surface distance exceeds the predetermined value d1, for example, also when a rough finish work is being performed, the mask range hereinafter described can be prevented from being widened more than necessary. It is to be noted that, although it has been assumed that the decision of an excavation operation is decided only from the operation pilot pressure of the arm, decision of an excavation operation may be made additionally on the basis of the operation pilot pressure of the boom 6 or the bucket 8. Further, the decision may be made taking not only an instantaneous value but also continuity of the operation pilot pressure in the past (namely, a time series of the detected operation pilot pressure), and the like into consideration. Further, not the operation pilot pressure, but, for example, an excavation reactive force or the like acting upon the arm cylinder 10 may be detected by a pressure sensor installed in the arm cylinder 10 to decide an excavation operation. Further, although it is decided here on the basis of both of the magnitude of the target surface distance (step S401) and the presence/absence of an excavation operation (step S402) whether or not the hydraulic excavator 1 is performing a work that requires accuracy, the decision may be made on one of these two processes (steps S401 and S402). In other words, the decision may be made based on at least one of the two processes.

Referring back to FIG. 7, when it is decided at step S40 that the hydraulic excavator 1 is not performing a work that requires accuracy, the processing advances to step S45. At step S45, the controller 38 starts measurement of a time period (duration) T during which the state in which it is decided that the hydraulic excavator 1 is not performing a work that requires accuracy continues, and then, the processing advances to step S70. It is to be noted that, when measurement of the time period T is already started at the time of reaching step S45, the measurement is assumed to be continued.

On the other hand, when it is decided at step S40 that the hydraulic excavator 1 is performing a work that requires accuracy, the processing advances to step S50.

At step S50, the controller 38 sets a range within which, when each of the two GNSS antennae 31 and 32 receives satellite signals from a plurality of GNSS satellites, the front work implement 5 possibly becomes an obstacle to the satellite signals, as a mask range in a coordinate system (for example, a site coordinate system) set to the ground. As hereinafter described, a satellite signal from a GNSS satellite positioned within the mask range can be excluded from the satellite signals to be utilized for position measurement by the GNSS receiver 33. In other words, a range of satellite arrangement that is not to be used for position measurement is calculated at step S50.

The controller 38 of the present embodiment sets a mask range at step S50 on the basis of the installation positions of the two GNSS antennae 31 and 32 on the upper swing structure 3 (hydraulic excavator 1) (for example, coordinate positions in the machine body coordinate system set to the upper swing structure 3) stored in the storage device of the controller 38 in advance, a movable range of the front work implement 5 (boom 6, arm 7, and bucket 8), an inclination angle of the upper swing structure 3 detected by the machine body IMU 21, and an azimuth angle of the upper swing structure 3 calculated from the vector information from the GNSS antenna 31 to the GNSS antenna 32. The mask range is set for each of the two GNSS antennae 31 and 32. The mask range can be defined by a combination of an azimuth angle range (angle range in the leftward and rightward direction) and an elevation angle range (angle range in the upward and downward direction) with reference to each of the GNSS antennae 31 and 32.

Further, when it is possible at step S50 to acquire shape data on obstacles (for example, a present terrain, buildings, and structures) that exist around the hydraulic excavator 1 and can become obstacles to satellite signals (shape data includes also positions), the controller 38 can set also a range within which satellite signals can be blocked by the obstacles as a mask range in addition to the setting of the mask range arising from the front work implement 5 described above. For example, a mask range may be set in the following manner. Present terrain data from the external recording medium 42 is stored in advance as shape data on obstacles in the storage device in the controller 38. Then at step S50, the controller 38 calculates, on the basis of the position, azimuth angle and inclination angle of the upper swing structure 3 in the geographic coordinate system (global coordinate system), installation positions of the two GNSS antennae 31 and 32 on the upper swing structure 3 (hydraulic excavator 1) and the present terrain data, a cross sectional shape of the present terrain in a predetermined azimuth angle direction with reference to the azimuth angle of the upper swing structure 3. Then, the controller 38 further takes into consideration a range within which the present terrain that has the cross sectional shape when each of the two GNSS antennae 31 and 32 receives satellite signals from a plurality of GNSS satellites may become an obstacle to the satellite signals, to thereby set the mask range.

Here, an example of the calculation process of a mask range at step S50 is described with reference to FIGS. 12 to 15. Although calculation of a mask range for the GNSS antenna 31 is described for the convenience of description, a mask range for the GNSS antenna 32 can also be calculated by a similar method.

For the elevation angle mask angle that defines an elevation angle range of a mask range, a direction from the horizontal plane to the sky is defined as a positive direction, and the zenith direction is defined as an elevation angle of 90 degrees. Therefore, as the elevation angle mask angle, the lower end is 0 degrees, and the upper end is 90 degrees in the maximum. Further, the azimuth angle mask angle that defines an azimuth angle range of a mask range is defined as a range from 0 degrees to 360 degrees with the north direction defined as 0 degrees and the clockwise direction defined as a positive direction.

Figure 13:
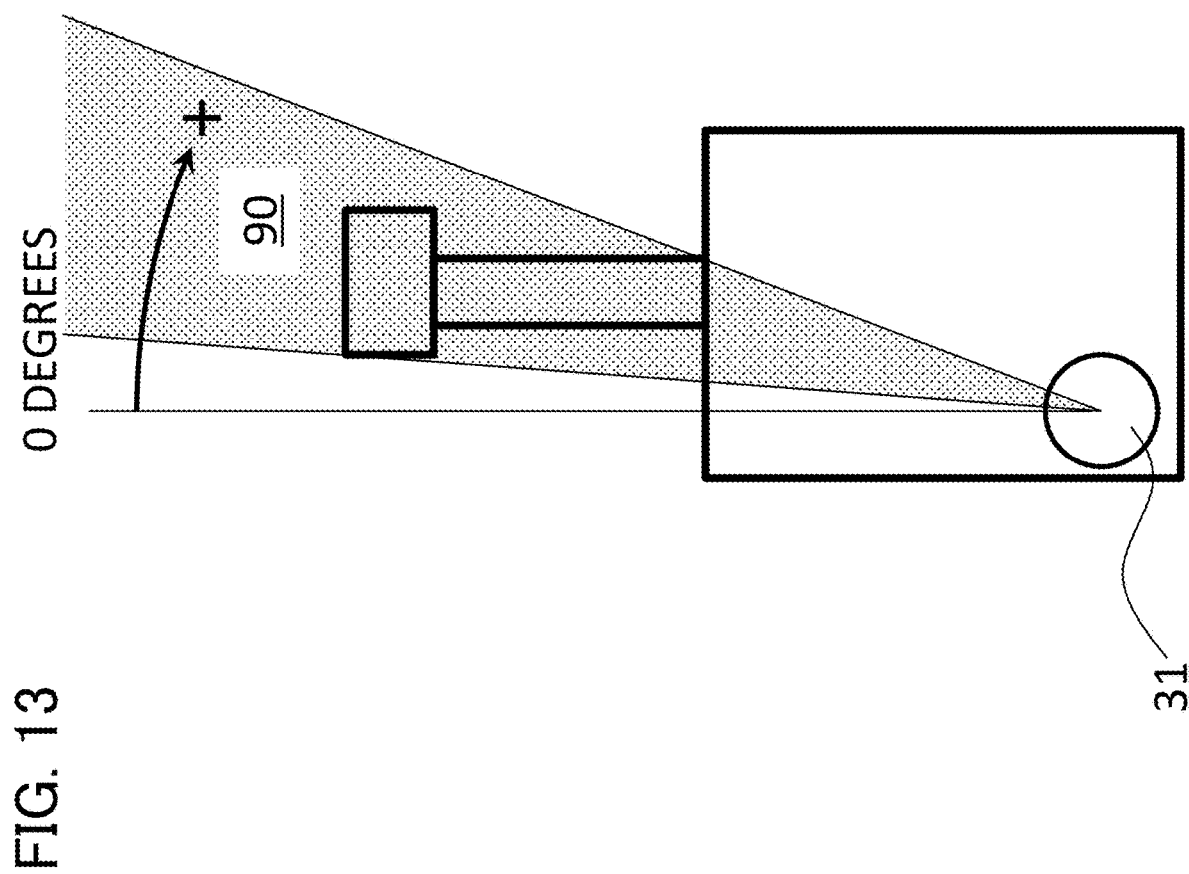
FIG. 13 is an explanatory view of the machine body reference azimuth angle.

In the storage device of the controller 38, an screened portion of the front work implement 5 as viewed from the GNSS antenna 31 is stored as a front screening elevation angle $\alpha ft$ for each azimuth angle with reference to the machine body (machine body reference azimuth angle). FIG. 12 is a view depicting an example of a relation between the machine body reference azimuth angle and the front screening elevation angle $\alpha ft$, and a front screening elevation angle $\alpha ft$ is set for each machine body reference azimuth angle. For each machine body reference azimuth angle, a range equal to or smaller than the front screening elevation angle $\alpha ft$ becomes a range (mask range) within which a satellite signal is blocked. The machine body reference azimuth angle and the front screening elevation angle $\alpha ft$ here are defined in the machine body coordinate system set to the upper swing structure 3. If, as depicted in FIG. 13, using the GNSS antenna 31 as a reference, the forward direction of the hydraulic excavator 1 is defined as machine body reference azimuth angle of 0 degrees and the clockwise direction is a positive direction, the front screening elevation angle $\alpha ft$ is defined at intervals of 5 degrees while the machine body reference azimuth angle reaches 360 degrees from 0 degrees. In the example of FIG. 12, since the front work implement 5 does not become an obstacle to satellite signals except a range of the machine body reference azimuth angle from 10 degrees to 25 degrees, the front screening elevation angle is 0 degrees. The range of the machine body reference azimuth angle from 10 degrees to 25 degrees is indicated as a mask range (azimuth angle range) 90 in FIG. 13. It is to be noted that the front screening elevation angle $\alpha ft$ may be defined from a maximum movable range of each of the front members 6, 7, and 8 or may be defined by a predicted movable range that is predicted to be used during a work.

Here, for explanation, calculation of an elevation angle mask angle of an influence by the machine body when the machine body reference azimuth angle is 15 degrees is described with reference to FIG. 14.

Figure 14:
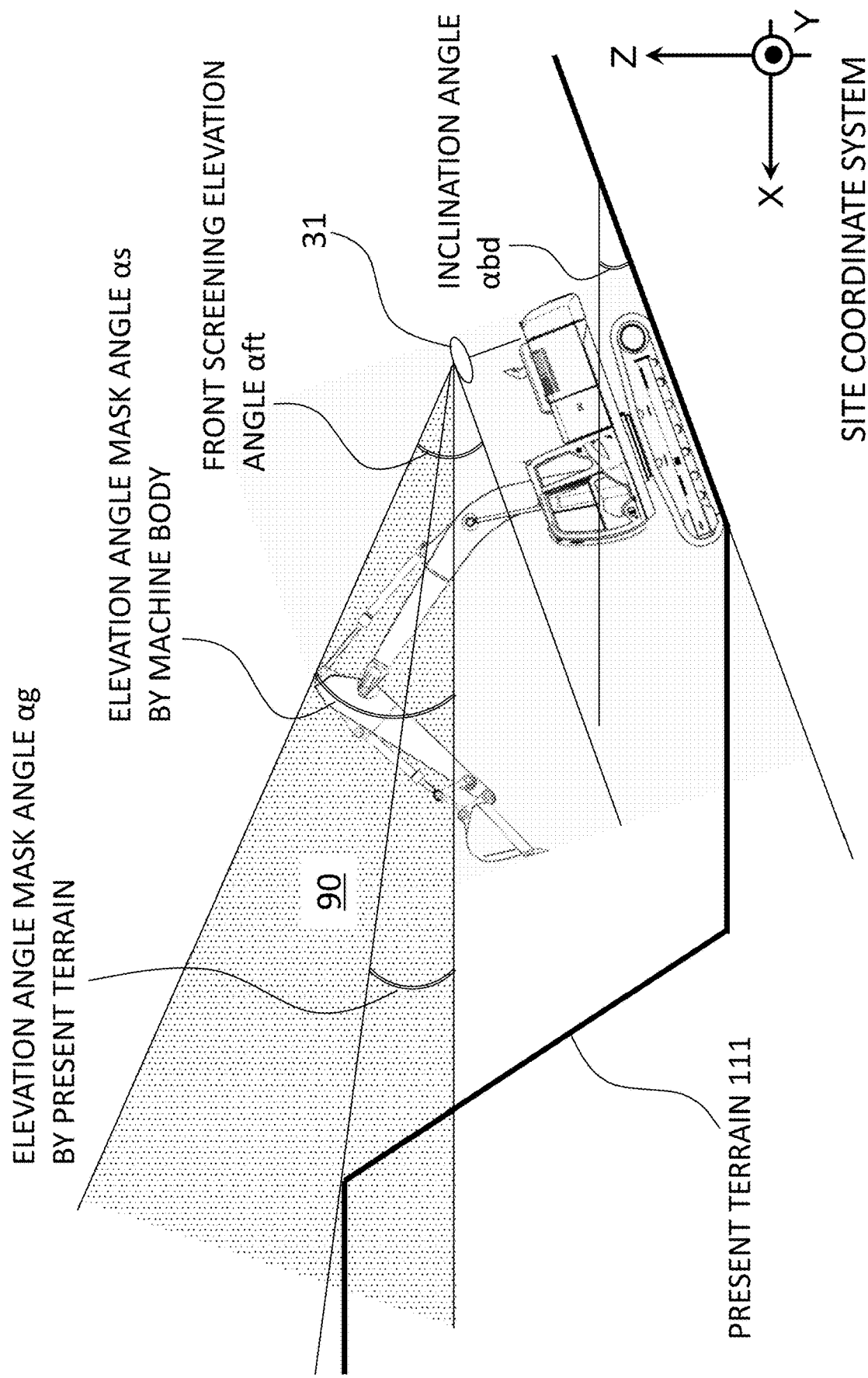
FIG. 14 is a view of a present terrain cross section when the machine body reference azimuth angle is 15 degrees as viewed from a side.

FIG. 14 is a view of a present terrain cross section when the machine body reference azimuth angle is 15 degrees as viewed from a side. As depicted in the figure, the elevation angle mask angle as by the machine body (front work implement 5) in the site coordinate system can be calculated according to the following expression (1) from the front screening elevation angle $\alpha ft$ in the machine body coordinate system and the inclination angle $\alpha bd$ of the machine body calculated by the machine body IMU 21.

$$\alpha s = \alpha ft - \alpha bd \tag{1}$$

Then, the elevation angle mask angle $\alpha g$ according to the present terrain in the site coordinate system is calculated. The present terrain depicted in FIG. 14 depicts a cross section of the present terrain in a direction of the machine body reference azimuth angle of 15 degrees. All straight lines that are tangential to the cross section of the present terrain are drawn from the position of the GNSS antenna 31 measured by the GNSS receiver 33, and a maximum value among angles defined by all straight lines and the horizontal plane is determined as the elevation angle mask angle $\alpha g$ according to the present terrain.

Figure 15:
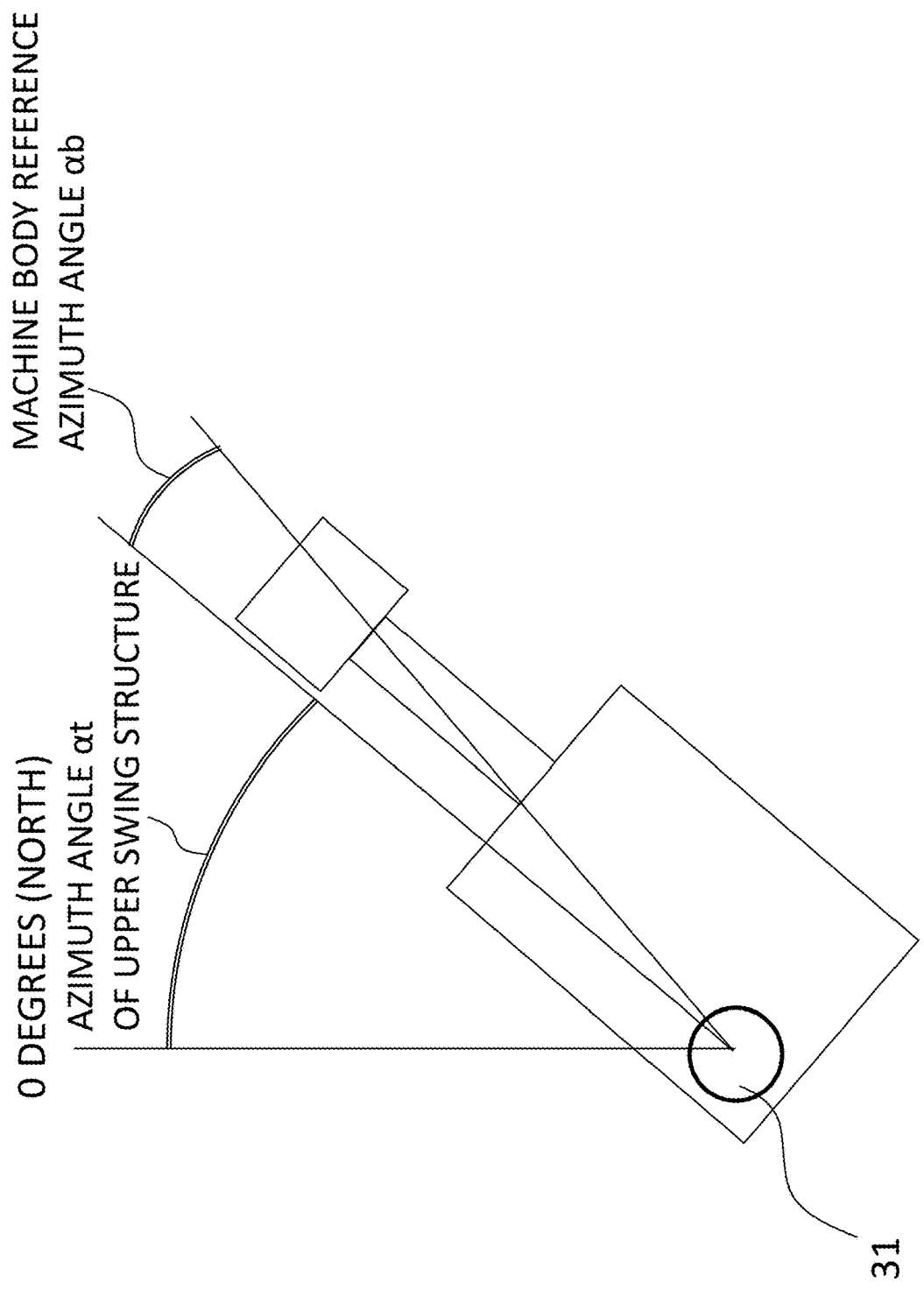
FIG. 15 is a view depicting a relation diagram of the machine body reference azimuth angle and an azimuth angle of an upper swing structure.

It is to be noted that, since the present terrain data is represented in the site coordinate system in which the north azimuth is defined as 0 degrees (reference) as depicted in FIG. 15, the cross section of the present terrain depicted in FIG. 14 can be acquired by taking a cross section of the present terrain data in an angle direction obtained by addition of a machine body reference azimuth angle $\alpha b$ to an azimuth angle $\alpha t$ of the upper swing structure 3 calculated by the GNSS receiver 33 (namely, $\alpha t + \alpha b$).

A greater one of the elevation angle mask angle as by the machine body and the elevation angle mask angle $\alpha g$ by the present terrain calculated in such a manner as described above is determined as an elevation angle mask angle at the azimuth angle. In the example in FIG. 14, $\alpha s > \alpha g$ is satisfied, and therefore, the elevation angle mask angle as by the machine body becomes the elevation angle mask angle, and the mask range 90 in the elevation angle range where the machine body reference azimuth angle is 15 degrees is as depicted in FIG. 14. Similar calculation is performed for all azimuths to calculate elevation angle mask angles at all azimuths. Then, a mask range is set to the site coordinate system on the basis of the resulting elevation angle mask angles. It is to be noted that it is sufficient if the mask range is set to the coordinate system set to the ground, and for example, the mask range may be set to the geographic coordinate system.

Referring back to FIG. 10, at step S60, the controller 38 adds (sums) the mask range calculated at step S50 (mask range set newly) to a mask range set before the present calculation cycle (mask range set in the past (however, except the mask ranges reset at steps S90 and S110 described hereinabove)). By this step S60, for example, when the inclination angle of the upper swing structure 3 changes after the process one cycle before or when the azimuth angle changes as a result of swing motion of the upper swing structure 3, a new mask range is set according to such changes. Then, since the new mask range is added to the mask ranges in the past, the mask range is expanded according to a change in the inclination angle and the azimuth angle of the upper swing structure 3.

At step S70, the controller 38 transmits the mask range stored in the storage device to the GNSS receiver 33. When the step S70 is reached after carrying out the step 60, the mask range at step S60 is transmitted to the GNSS receiver 33, and when the step 70 is reached after carrying out the step S45, the last mask range set at step S60 is transmitted (however, where the step S60 is not carried out at all after the mask range is reset at step S90 or S110, the mask range is not transmitted).

At step S80, the controller 38 decides whether or not information that position measurement cannot be performed in a state in which the mask range is set is received from the GNSS receiver 33. For this decision, a process described below is performed by the GNSS receiver 33. In particular, the GNSS receiver 33 receives the mask range transmitted from the controller 38 at step S70, excludes satellites that are positioned within the mask range from among a plurality of GNSS satellites from which a satellite signal can be received, and decides whether or not position measurement calculation can be performed on the basis of satellite signals transmitted from the remaining satellites. When the GNSS receiver 33 decides that the position measurement calculation can be performed, the GNSS receiver 33 transmits information indicating that position measurement is possible in the state in which the mask range is set to the controller 38. Further, the GNSS receiver 33 calculates the position of the GNSS antenna 31 and the vector from the GNSS antenna 31 to the GNSS antenna 32 and outputs a result of the calculation to the controller 38. On the other hand, when position measurement calculation cannot be performed because the number of satellites to be used is insufficient (for example, less than five) as a result of setting of the mask range or because the arrangement of satellites to be used is biased (for example, the DOP is equal to or higher than a predetermined value), causing a risk of accuracy reduction, in order to allow position measurement calculation to be performed in a state in which the mask range is cancelled at step S90 hereinafter described, the GNSS receiver 33 transmits information indicating that position measurement cannot be performed in the state in which the mask range is set to the controller 38.

It is to be noted that, although a case in which an azimuth angle range and an elevation angle range to be masked are calculated by the controller 38 and the ranges (mask range) are transmitted to the GNSS receiver 33 has been described here, the controller 38 may acquire satellite numbers of satellites from which satellite signals can be received and information of the azimuth angle and the angle of elevation of the satellites from the GNSS receiver 33, calculate satellite numbers of satellites existing within the mask range calculated by the controller 38, and transmit the satellite numbers that are not used for position measurement calculation to the GNSS receiver 33, so that the decision described hereinabove may be carried out.

When the information that position measurement cannot be performed in a state in which the mask range is set is received from the GNSS receiver 33 at step S80, the controller 38 advances the processing to step S90 at which to display that there is the possibility that the position measurement accuracy may be deteriorated on the screen of the display device 39 and reset the information of the mask range stored in the controller 38. Accordingly, all mask ranges are erased. It is to be noted that the time period T measured at step S45 is also reset simultaneously with the resetting of the mask range. On the other hand, when the information that position measurement is possible even in the state in which the mask range is set is received from the GNSS receiver 33 at step S80 (namely, when information that position measurement is impossible in the state in which the mask range is set is not received), the processing advances to step S100.

At step S100, the controller 38 decides whether or not it is necessary to reset (erase) the mask range. In this decision, the controller 38 decides that it is necessary to reset the mask range in any of a case in which the time period T measured at step S45 continues for a predetermined time period t1 or more (for example, for 10 minutes or more), another case in which the hydraulic excavator 1 moves by a predetermined distance or more (for example, 3 m or more) by a traveling operation for the lower track structure 2 by the operation device in the cab 4, a further case in which a demand of the operator that the mask range is to be reset is inputted through the setting switch (mask range reset switch) 40, and a still further case of a first calculation cycle immediately after system startup. The movement of the hydraulic excavator 1 by the traveling operation can be detected, for example, from pilot pressure detection for traveling and position movement of the hydraulic excavator 1 that is performed on the basis of position measurement calculation of the GNSS receiver 33.

When it is decided at step S100 that it is necessary to reset the mask range, the controller 38 advances the processing to step S110 at which resetting of the mask range is performed and the time period T measured at step S45 is also reset to zero at the same time.

By carrying out the processing described above, when a work that requires accuracy is being performed by the hydraulic excavator 1, satellite signals that may possibly be influenced by an obstacle including the front work implement 5 are not used for position measurement calculation. Therefore, deterioration in the accuracy in position measurement calculation due to switching of the combination of satellites to be used for position measurement calculation on the way of excavation can be prevented, and deterioration in the accuracy in position measurement calculation due to use of a satellite signal influenced by diffraction of radio waves can be prevented.

Advantageous Effects

In the hydraulic excavator 1 configured in such a manner as described above, a mask range according to the azimuth angle and the inclination angle of the upper swing structure 1 during a work is set to the site coordinate system, and position measurement calculation is performed by the GNSS receiver 33 without utilizing satellite signals of GNSS satellites positioned within the mask range. Consequently, it is prevented that the position measurement accuracy of the GNSS is deteriorated during a work by switching of satellites associated with operation of the front work implement 5 (principally, from boom raising operation) or diffraction of satellite signals. As a result, since the position calculation result of the monitor point is prevented from fluctuating, the control accuracy of the hydraulic excavator 1 can be improved.

Especially, the hydraulic excavator 1 described above has such a specification that a mask range is set while a work that requires accuracy is being performed, and in a state in which a work that does not require accuracy continues for the predetermined time period t1 or more, in another state in which the measurement position accuracy is deteriorated by setting of a mask range, or in a like state, the setting of the mask range is cancelled. In particular, the hydraulic excavator 1 is configured such that, while a mask range is set only in a scene in which the accuracy is required to secure position measurement accuracy, in another scene in which accuracy is not required or in a further scene in which accuracy cannot be secured, immediacy not of accuracy but of position measurement is prioritized such that position measurement suitable for a scene can be performed.

Further, in the hydraulic excavator 1 described above, when the azimuth angle or the inclination angle of the upper swing structure 3 changes, a mask range is set newly according to the change and the new mask range is added to a mask range set in the past thereby to expand the mask range. In particular, for example, when the upper swing structure 3 swings from an excavation position to a soil-dumping position, a mask range is set according to a change in azimuth angle of the upper swing structure 3 during the swing movement and is summed to the mask range in the past. Consequently, it can be avoided that different satellites are selected at the excavation position and the soil-dumping position, and therefore, the measurement accuracy can be prevented from being deteriorated by switching of satellites.

Further, if shape data on an obstacle is stored in advance in the controller 38, then a mask range can be set taking into consideration an influence by not only the front work implement 5 but also the obstacle (for example, a present terrain) on position measurement. Consequently, position measurement calculation can be performed without utilizing signals of satellites blocked by the obstacle, and therefore, the position measurement accuracy can be improved further.

Although the embodiment of the present invention has been described in detail above, the present invention is not restricted to the embodiment described above but includes various modifications. For example, the embodiment described above has been described in detail in order to explain the present invention in an easy-to-understand manner and is not necessarily limited to what includes all configurations described above.

For example, although, in the flow chart of FIG. 10 described above, presence or absence of setting of a mask range is switched depending upon whether or not a work that requires accuracy is being performed, a mask range may be set in all cases.

Further, the individual configurations relating to the controller (control device) 38 described above and the functions, execution processes, and so forth of the individual configurations may be partly or entirely implemented by hardware (for example, by designing the logic for executing the functions with an integrated circuit). Further, a configuration relating to the controller 38 described above may be a program (software) by which the functions relating to the configuration of the controlling device are implemented by an arithmetic processing unit (for example, a CPU) by reading out and executing the program. Information relating to the program can be stored, for example, into a semiconductor memory (flash memory, SSD, or the like), a magnetic storage device (hard disk drive or the like), a recording medium (magnetic disk, optical disc, or the like), or the like.

Further, although, in the description of each embodiment described above, those of controls lines and information lines considered necessary for description of the embodiment are described, all of control lines and information lines relating to a product are not necessarily indicated. It may be considered that actually almost all configurations are connected to each other.

DESCRIPTION OF REFERENCE CHARACTERS

1: Hydraulic excavator (work machine)
2: Lower track structure
3: Upper swing structure
4: Cab
5: Front work implement (work device)
6: Boom
7: Arm
8: Bucket
9: Boom cylinder
10: Arm cylinder
11: Bucket cylinder
21: Machine body IMU
22: Boom IMU
23: Arm IMU
24: Bucket IMU
31, 32: GNSS antenna
33: GNSS receiver
34: RTK correction data receiving antenna
39: Display device
40: Setting switch (mask range reset switch)
42: External recording medium
50: Office side measurement system
51: GNSS reference station (GNSS receiver)
52: GNSS reference station antenna
53: Wireless device
54: RTK correction data transmission antenna
61: Present terrain
62: Target terrain
71: Excavation position
72: Soil-dumping position
81 to 87: GNSS satellite
200: Position measurement system

The invention claimed is:

1. A work machine that includes a track structure, an upper swing structure swingably attached on the track structure, a work device that includes a boom rotatably provided in an upward and downward direction on the upper swing structure, an arm rotatably provided in the upward and downward direction at a distal end of the boom, and a bucket rotatably provided in the upward and downward direction at a distal end of the arm, two GNSS antennae installed on the upper swing structure, a receiver configured to calculate a position and an azimuth angle of the upper swing structure on a basis of satellite signals transmitted from a plurality of satellites and received by the two GNSS antennae, a controller configured to calculate a position of a monitor point on a basis of the position and the azimuth angle of the upper swing structure calculated by the receiver, and a sensor for detecting an inclination angle of the upper swing structure, wherein the controller is configured to set, on a basis of installation positions of the two GNSS antennae on the work machine, a movable range of the work device, the inclination angle of the upper swing structure detected by the sensor, and the azimuth angle of the upper swing structure calculated by the receiver, a range within which, when the two GNSS antennae individually receive satellite signals from the plurality of satellites, the work device possibly becomes an obstacle to the satellite signals as a mask range in a coordinate system set to a ground, the mask range is a combination of an azimuth angle range that is an angle range in a leftward and rightward direction, and an elevation angle range that is an angle range in the upward and downward direction, with reference to each of the GNSS antennae, and the receiver is configured to calculate the position and the azimuth angle of the upper swing structure on a basis of the satellite signals transmitted from remaining ones of the plurality of satellites, the remaining ones other than the satellites positioned within the mask range set by the controller.

2. The work machine according to claim 1, wherein the controller decides whether or not the work machine is performing a work that requires accuracy and sets the mask range when the controller decides that the work machine is performing a work that requires accuracy.

3. The work machine according to claim 2, wherein the controller cancels the setting of the mask range when any one of a case in which a state that it is decided that the work machine is not performing a work that requires accuracy continues for a predetermined period of time or more, another case in which the work machine moves a predetermined distance or more, and a further case in which the position of the upper swing structure is not able to be calculated with satellite signals transmitted from the remaining satellites is applicable.

4. The work machine according to claim 1, wherein the controller decides whether or not the work machine is performing a work that requires accuracy on a basis of at least one of a distance between the work device and a target surface and an inputting operation to an operation device that operates the work device, and sets the mask range when the controller decides that the work machine is performing a work that requires accuracy.

5. The work machine according to claim 1, wherein the controller is configured to newly set the mask range according to a change in the inclination angle and the azimuth angle of the upper swing structure and is configured to add the new mask range to the mask range set in a past.

6. The work machine according to claim 1, wherein the controller includes a storage device in which shape data on an obstacle around the work machine is stored, and the controller is configured to calculate, on a basis of the position and the azimuth angle of the upper swing structure and the shape data on the obstacle, a cross sectional shape when the obstacle is cut in a predetermined azimuth angle direction with reference to the azimuth angle of the upper swing structure and is configured to set the mask range further taking into consideration an influence by the obstacle having the cross sectional shape when the two GNSS antennae individually receive satellite signals from the plurality of satellites.

* * * * *